United States Patent [19]
Fujihara et al.

[11] Patent Number: 5,764,303
[45] Date of Patent: Jun. 9, 1998

[54] VERTICAL DEFLECTION CONTROL CIRCUIT AND TELEVISION RECEIVER USING SUCH VERTICAL DEFLECTION CONTROL CIRCUIT

[75] Inventors: Kazuhiko Fujihara; Akira Shirahama, both of Kanagawa, Japan

[73] Assignee: Sony Corporation, Tokyo, Japan

[21] Appl. No.: 613,508

[22] Filed: Mar. 11, 1996

[30] Foreign Application Priority Data

Mar. 20, 1995 [JP] Japan ................................. 7-061201

[51] Int. Cl.$^6$ ............................................. H04N 5/04
[52] U.S. Cl. ........................................ 348/547; 348/447
[58] Field of Search .................................. 348/547, 548, 348/536, 540, 542, 543, 546, 447, 448, 458, 456, 518, 519, 805; 315/364, 368.13; H04N 5/44, 5/12, 5/04, 3/27, 3/22, 7/01, 11/20

[56] References Cited

U.S. PATENT DOCUMENTS

| | | | |
|---|---|---|---|
| 4,672,446 | 6/1987 | Ikeda et al. | 348/447 |
| 4,680,632 | 7/1987 | Willis et al. | 348/447 |
| 5,473,223 | 12/1995 | Murakami | 315/367 |

FOREIGN PATENT DOCUMENTS

| | | | |
|---|---|---|---|
| 6168473 | 12/1981 | European Pat. Off. | H04N 3/16 |
| 0185096 | 6/1986 | European Pat. Off. | H04N 3/27 |
| 0242123 | 10/1987 | European Pat. Off. | H04N 5/44 |
| 4413837 | 10/1994 | Germany | H04N 3/22 |

*Primary Examiner*—Christopher C. Grant
*Attorney, Agent, or Firm*—Jay H. Maioli

[57] ABSTRACT

A vertical deflection control circuit includes a double-speed counter (18) for counting a clock with a frequency of $2f_H$, $f_H$ representing a horizontal frequency of an inputted video signal, in synchronism with a vertical sync signal, timing generating means (20) for judging even-field/odd-field of the input video signal and generating a timing signal based on a judged result, and offset signal adding circuitry (28) for adding an offset value to an output of the double-speed counter (18) at a timing of the timing signal, thereby a video signal in a vertical deflection system can be double-scanning-converted with a simple arrangement.

5 Claims, 8 Drawing Sheets

FIG. 9A  Offset-Add-Timing Data

FIG. 9B  Input to V. Deflection Wave Generator

FIG. 10

VERTICAL DEFLECTION CONTROL CIRCUIT AND TELEVISION RECEIVER USING SUCH VERTICAL DEFLECTION CONTROL CIRCUIT

BACKGROUND OF THE INVENTION

The present invention relates to a vertical deflection control circuit for use in controlling a vertical deflection circuit of a television receiver and a monitor receiver, and a television receiver having such a vertical deflection control circuit.

Heretofore, there have been developed television receivers in which a flicker of a displayed image can be suppressed by doubling a field frequency of an input video signal.

Figure 1:
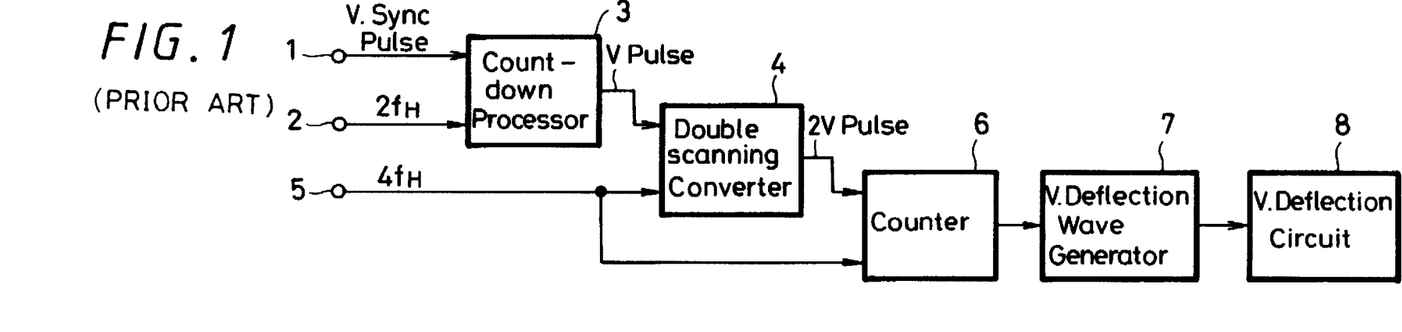
FIG. 1 is a block diagram showing an example of a double-scanning converting circuit used in a television receiver.

FIG. 1 of the accompanying drawings shows, in block diagram form, a control system for a vertical deflection circuit used when the field frequency is doubled. For example, a video signal (e.g., PAL video signal) with a field frequency of 50 Hz is converted to a video signal with a field frequency of 100 Hz and thereby displayed on a cathode ray tube (CRT) not shown.

As show n in FIG. 1, a vertical sync (synchronizing) signal with a frequency of 50 Hz is applied to an input terminal 1. A signal with a frequency of $2f_H$ (referred to hereinafter simply as a "$2f_H$ signal"), which is twice a horizontal frequency $f_H$ of an inputted video signal is applied to a pulse input terminal 2. The vertical sync signal and the $2f_H$ signal are supplied to a count-down processor 3.

The count-down processor 3 generates a vertical sync pulse with an accuracy of $2f_H$ (hereinafter referred to as a "V pulse") synchronized with a field frequency of 50 Hz by counting the $2f_H$ signal which is twice the horizontal frequency $f_H$, and supplies the V pulse to a double-scanning converter 4. The double-scanning converter 4 receives a signal with a frequency of $4f_H$, which is four times the horizontal frequency $f_H$ of the input video signal from an input terminal 5. The double-scanning converter 4 generates a pulse with a frequency twice the field frequency of 50 Hz (hereinafter referred to as a "2 V pulse") by counting a pulse with a frequency of $4f_H$ which is four times the horizontal frequency $f_H$ of the input video signal, and supplied the 2 V pulse to a counter 6. The double-scanning converter 4 generates the 2 V pulse by counting the $4f_H$ pulse, and hence the 2 V pulse has an accuracy of the frequency of $4f_H$.

The counter 6 receives the pulse with a frequency $4f_H$ four times the horizontal frequency $f_H$ and the 2 V pulse, and counts the $4f_H$ pulse while being reset by the 2 V pulse. Data indicative of a count value from the counter 6 is supplied to a vertical deflection wave generator 7 which generates a voltage with a waveform corresponding to the count value data supplied thereto from the counter 6. This voltage waveform is supplied to a vertical deflection circuit 8 of a cathode ray tube (not shown). The vertical deflection circuit 8 vertically deflects electron beams on a screen of the cathode ray tube by use of the frequency twice the vertical frequency of the input video signal.

An operation of the circuit shown in FIG. 1 will be described below with reference to FIGS. 2A to 2C.

Figure 2A:
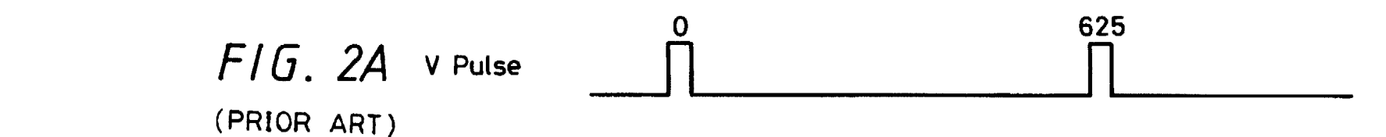
FIGS. 2A to 2C are timing charts used to explain an operation of the double-scanning converting circuit shown in FIG. 1.
Figure 2B:
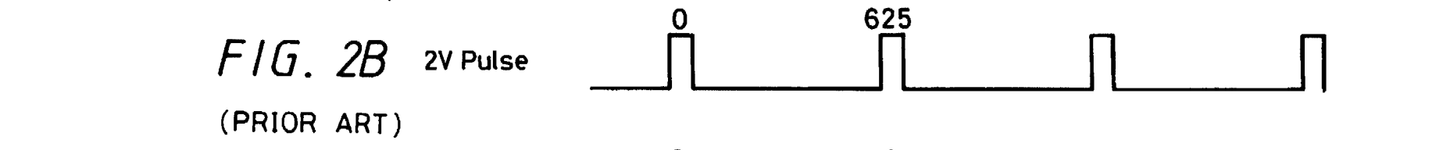

FIG. 2A shows the V pulse which the count-down processor 3 outputs each time it counts the pulse with a frequency of $2f_H$ twice the horizontal frequency $f_H$ at every 625 periods. As shown in FIG. 2B, the 2 V pulse is output from the double-scanning converter 4 each time the double-scanning converter 4 counts the pulse with a frequency $4f_H$ four times the horizontal frequency $f_H$ at every 625 periods.

Figure 2C:
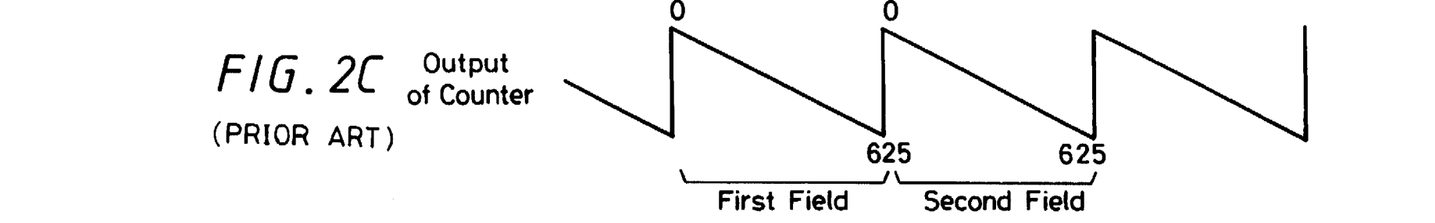

A sawtooth waveform that has been output from the vertical deflection wave generating circuit 7 in response to the output data supplied thereto from the counter 6, sequentially changed its voltage value in a range of from a count value of "0" to a count value of "625" in synchronism with the 2 V pulse as shown in FIG. 2C. The vertical deflection circuit 8 vertically deflects electron beams on a screen of the cathode ray tube by use of the frequency twice the vertical frequency of the inputted video signal based on the waveform shown in FIG. 2C.

Figure 3A:
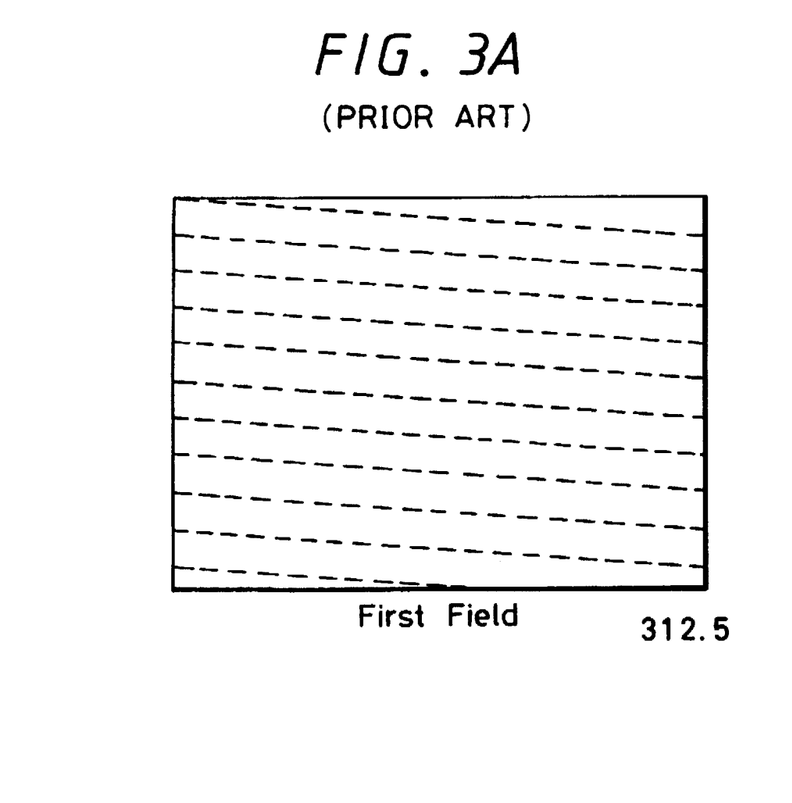
FIGS. 3A and 3B are diagrams used to explain a manner in which each field of an input video signal is divided into a first field and a second field by double-scanning conversion.
Figure 3B:
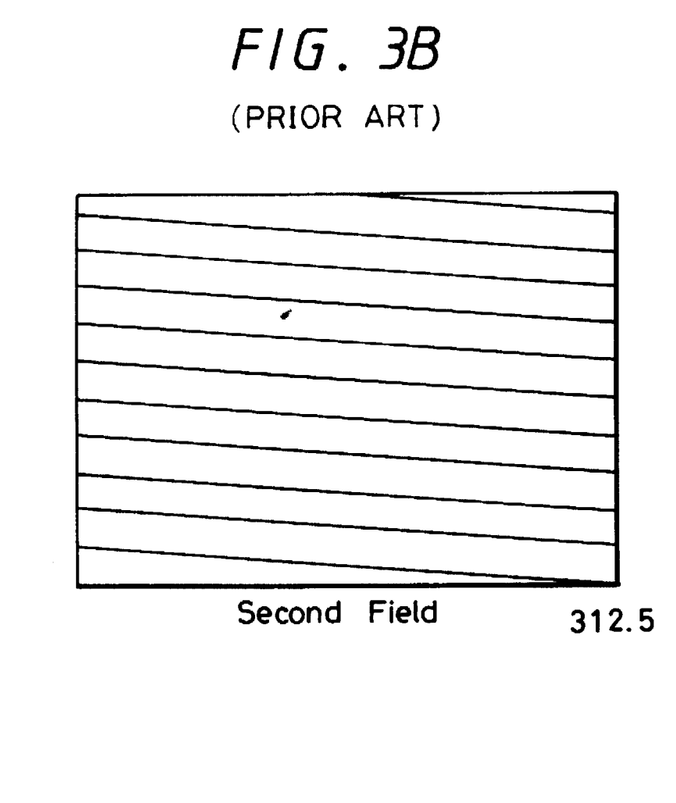

When electron beams are vertically deflected on a screen of the cathode ray tube by the vertical deflection circuit 8 as described above, each field of the input video signal, for example, is divided into a first field shown in FIG. 3A and a second field shown in FIG. 3B, and horizontal lines are scanned at speed twice the normal speed. Positions of horizontal lines are different in the first and second fields, resulting in an interlaced scanning being realized. A double-scanning conversion in the horizontal deflection system will not be described herein for the sake of brevity.

However, the double-scanning converting circuit in the vertical deflection system is complicated in arrangement because the count-down processor 3 and the double-scanning converter 4 are composed of counters, and there are required three counters, in total, including the counter 6. Moreover, these counters are connected in series and a redundancy caused when a video signal is processed becomes considerably large. There is then the risk that the video signal will be distorted when the pulse signal is supplied from a preceding counter to a succeeding counter. Furthermore, if the above double-scanning converting circuit is applied to a reverse-interlaced scanning where the order of interlaced-scanning is reversed, then the circuit shown in FIG. 1 has to be modified by adding other necessary circuits, and such a modification makes the circuit shown in FIG. 1 become more complicated.

If the number of counters were decreased and the double-scanning conversion were carried out by counting only the pulse with a frequency of $2f_H$ twice the horizontal frequency $f_H$, for example, the first field and the second field become equal to each other, thereby the interlaced-scanning being changed to a non-interlaced scanning.

SUMMARY OF THE INVENTION

In view of the aforesaid aspect, it is an object of the present invention to provide a vertical deflection control circuit and a television receiver having such a vertical deflection control circuit in which a video signal in a vertical deflection system can be double-scanning-converted by a simple arrangement.

According to an aspect of the present invention, there is provided a vertical deflection control circuit which is comprised of a double-speed counter for counting a clock with a frequency of $2f_H$ in synchronism with a vertical sync signal where $f_H$ represents a horizontal frequency of an input video signal, a timing generating circuit for judging even-field/odd-field of the inputted video signal and generating a timing signal based on a judged result, and an offset signal adding circuit for adding an offset value to an output of the double-speed counter at a timing of the timing signal.

According to another aspect of the present invention, there is provided a television receiver having a vertical deflection control circuit which is comprised of a double-speed counter for counting a clock with a frequency of $2f_H$ in synchronism with a vertical sync signal where $f_H$ represents a horizontal frequency of an input video signal, a timing generating circuit for judging even-field/odd-field of the inputted video signal and generating a timing signal based on a judged result, an offset signal adding circuit for adding an offset value to an output of the double-speed counter at a timing of the timing signal, and a vertical deflection circuit for vertically deflecting electron beams on a screen of a cathode ray tube based on an output from the offset signal adding circuit.

According to still another aspect of the present invention, there is provided a television receiver having a vertical deflection control circuit which is comprised of a counter for counting a clock with a frequency of $2f_H$ and reset by a vertical sync signal or a pulse associated with the vertical sync signal where $f_H$ represents a horizontal frequency of an input video signal, a vertical deflection wave generating circuit for generating a sawtooth wave with a frequency twice the frequency of the vertical sync signal from an output of the counter, an offset signal generating circuit for generating an offset signal from a sync pulse with a frequency twice the frequency of the vertical sync signal obtained from the counter and the clock signal with a frequency of $2f_H$, the offset signal being changed with a frequency twice the frequency of the vertical sync signal, and a circuit for adding the output of the offset signal generating circuit to an output of the counter.

According to the present invention, a vertical deflection can be controlled with an accuracy higher than a count accuracy of the double-speed counter.

DETAILED DESCRIPTION OF THE PREFERRED EMBODIMENT

The present invention will now be described with reference to FIGS. 4 through 10.

Figure 4:
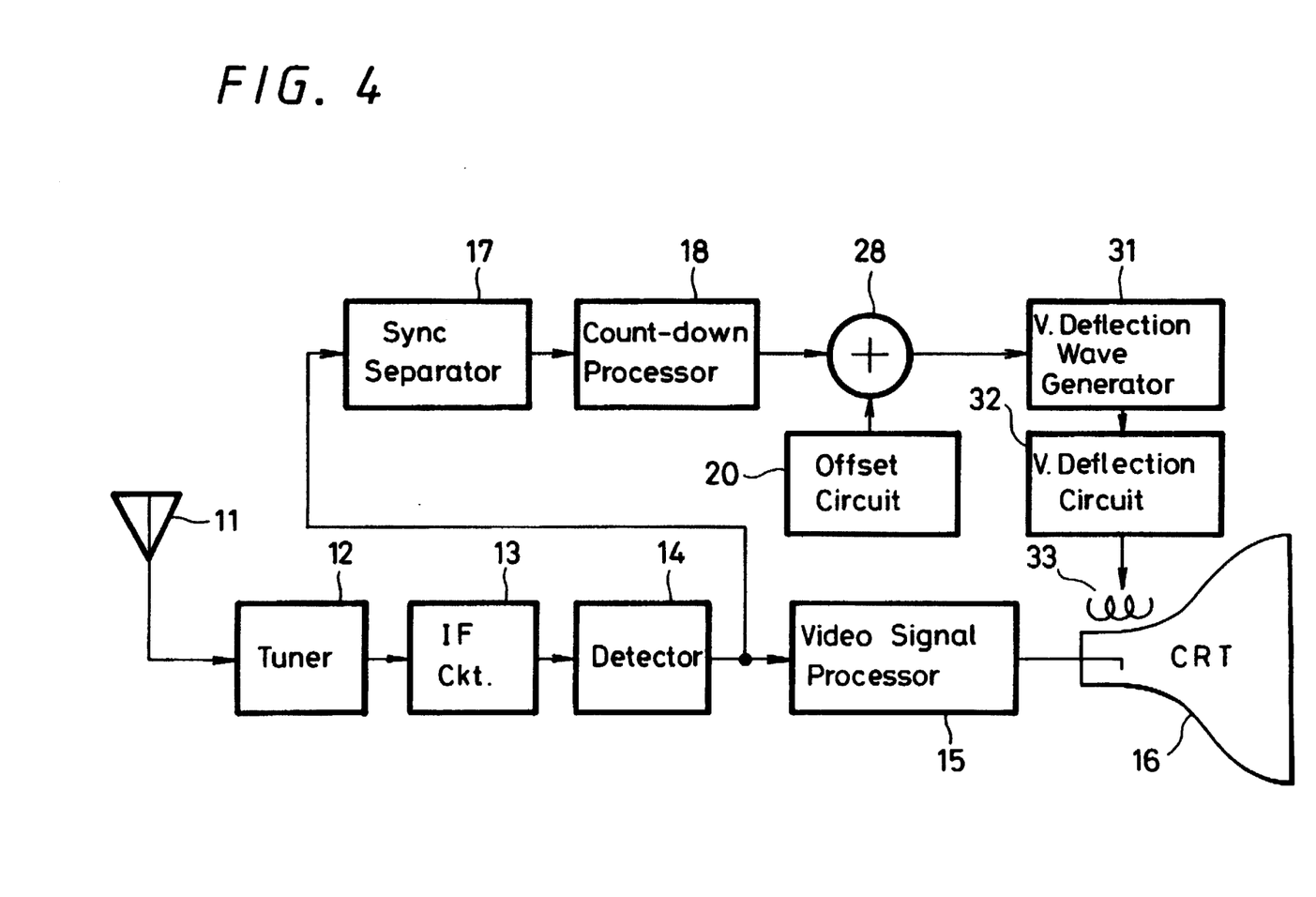
FIG. 4 is a block diagram showing an overall arrangement of a television receiver according to the present invention.

The present invention is applied to a television receiver wherein a field frequency is double-scanning-converted. FIG. 4 shows, in block form, an overall arrangement of such a television receiver which receives and reproduces a video signal of a broadcast system such that a field frequency is 50 Hz and 625 horizontal scanning lines (one frame is composed of two fields) are required, e.g., PAL video signal, or the like.

As shown in FIG. 4, a broadcast wave received at an antenna 11 is supplied to a tuner 12 and thereby converted into an intermediate frequency (IF) signal. The IF signal from the tuner 12 is supplied to an intermediate frequency (IF) circuit 13, in which it is processed in a predetermined manner such as being amplified. The IF signal from the IF circuit 13 is supplied to a detector 14 which detects a video signal. The video signal detected by the detector 14 is supplied to and processed by a video signal processor 15 and then fed to a cathode ray tube (CRT) 16.

The video signal detected by the detector 14 is also supplied to a sync separator 17 which separates vertical and horizontal sync signals from the video signal. The vertical and horizontal sync signals from the sync separator 17 are supplied to a count-down processor 18. The sync separator 17 generates a pulse with a frequency of $f_H$ of the horizontal sync signal and a pulse with a frequency $2f_H$ twice the frequency $f_H$ together with the vertical and horizontal sync signals.

The count-down processor 18 generates a vertical deflection control signal with a frequency twice the vertical sync signal by counting down the pulse with a frequency of $2f_H$ while being reset by the vertical sync signal. At the same time the count-down processor 18 generates the vertical deflection control signal, an offset circuit 20 generates an offset signal. Then, an adder 28 adds the offset signal to the vertical deflection control signal at a predetermined timing. The vertical deflection control signal with the offset signal added thereto is supplied to a vertical deflection wave generator 31. A vertical deflection wave generated from the vertical deflection wave generator 31 is supplied to a vertical deflection circuit 32, and the vertical deflection circuit 32 drives a vertical deflection coil of the CRT 16. A horizontal deflection system of this television receiver is not shown in FIG. 4 for the sake of brevity.

The count-down processor 18 and the offset circuit 20 will be described more in detail with reference to FIG. 5.

Figure 5:
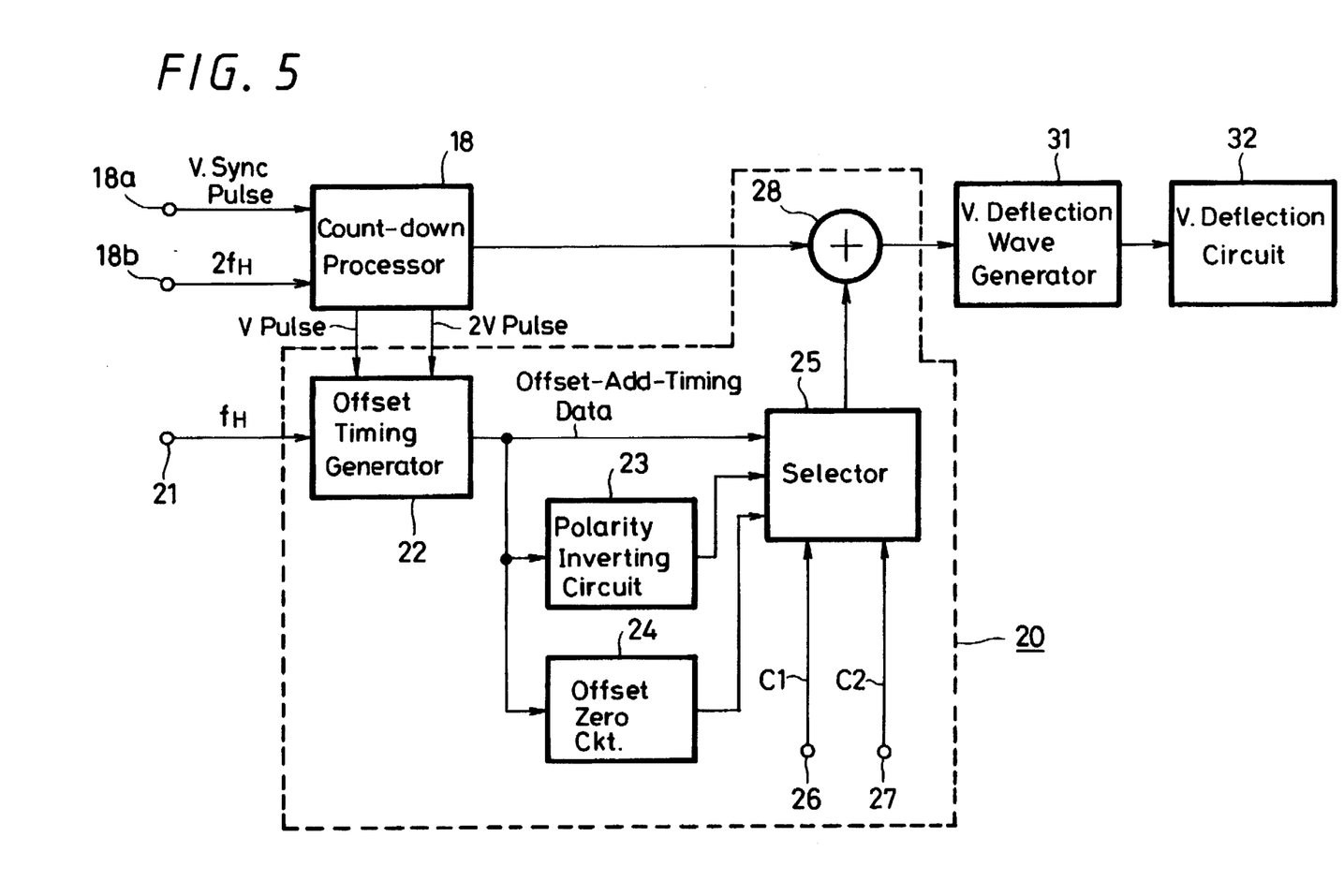
FIG. 5 is a block diagram showing a count-down processor and an offset circuit shown in FIG. 4 in more detail.

As shown in FIG. 5, the count-down processor 18 receives the vertical sync signal from a terminal 18a and the pulse with a frequency of $2f_H$ from a terminal 18b. The countdown processor 18 counts the pulse with a frequency of $2f_H$ while being reset by the vertical sync signal, and supplies count data to the adder 28. A video signal inputted to the television receiver (video signal detected by the detector 14 shown in FIG. 4) is a video signal with 625 horizontal lines of one frame, and the count-down processor 18 counts the pulse by the pulse with a frequency twice the horizontal frequency thereby to obtain count values ranging from "0" to "625" at every field of the double-scanning-converted video signal. However, since the count-down processor 18 counts the pulse by the pulse with a frequency twice the horizontal frequency of the video signal, count values are all even-numbered count values so that a field with count values ranging from "0" to "624" and a field with count values ranging from "0" to "626" are alternately existing at every field of the double-scanning-converted video signal.

The count-down processor 18 generates a vertical sync pulse (V pulse) with an accuracy of a frequency $2f_H$ twice the horizontal frequency $f_H$ of the input video signal, and also generates a 2 V pulse with a frequency twice the frequency of the V pulse. The 2 V pulse that has been generated from the count-down processor 18 has an accuracy of the frequency of $2f_H$ because the count-down processor 18 generates it by counting the pulse with a frequency of $2f_H$.

The V pulse and the 2 V pulse are supplied to an offset timing generator 22 disposed within the offset circuit 20. A pulse with a horizontal frequency of $f_H$ of the inputted video signal applied to a terminal 21 is supplied to the offset timing generator 22. The offset timing generator 22 discriminates even-field and odd-field of the input video signal based on the pulses supplied thereto, and outputs even/odd-discriminated data based on the judged result as offset-add-timing data.

The offset-add-timing data output from the offset timing generator 22 is supplied to a polarity inverting circuit 23, an offset-zero circuit 24 and a selector 25. The polarity inverting circuit 23 inverts a polarity of offset-add-timing data, and supplies the offset-add-timing data with an inverted polarity to the selector 25. The offset-zero circuit 24 converts the offset-add-timing data into offset-zero data, and supplies the converted offset-zero data to the selector 25.

The selector 25 selects output data from data supplied thereto based on control signals C1, C2 applied to terminals 26, 27, and supplies selected data to the adder 28. The control signal C1 is an inverting control signal for determining whether to select the output of the polarity inverting circuit 23. The control signal C2 is an offset-zero control signal for determining whether to select the offset-zero data. The control signals C1, C2 are supplied to the terminals 26, 27 from a control unit (not shown) which controls a double-scanning-conversion.

The adder 28 adds the data output from the selector 25 to count data of one field period of the double-scanning-converted video signal output from the count-down processor 18, and supplies resultant data to the vertical deflection wave generator 31. The vertical deflection wave generator 31 generates a voltage signal corresponding to a value of data supplied thereto from the adder 28. Therefore, the output of the vertical deflection wave generator 31 has a sawtooth waveform of one field period of the double-scanning-converted video signal.

The sawtooth waveform of one-field period of the double-scanning-converted video signal output from the vertical deflection wave generator 31 is supplied to the vertical deflection circuit 32 which vertically deflects electron beams on a picture screen of the CRT 16 (FIG. 4) at every field period of the double-scanning-converted video signal.

Figure 6:
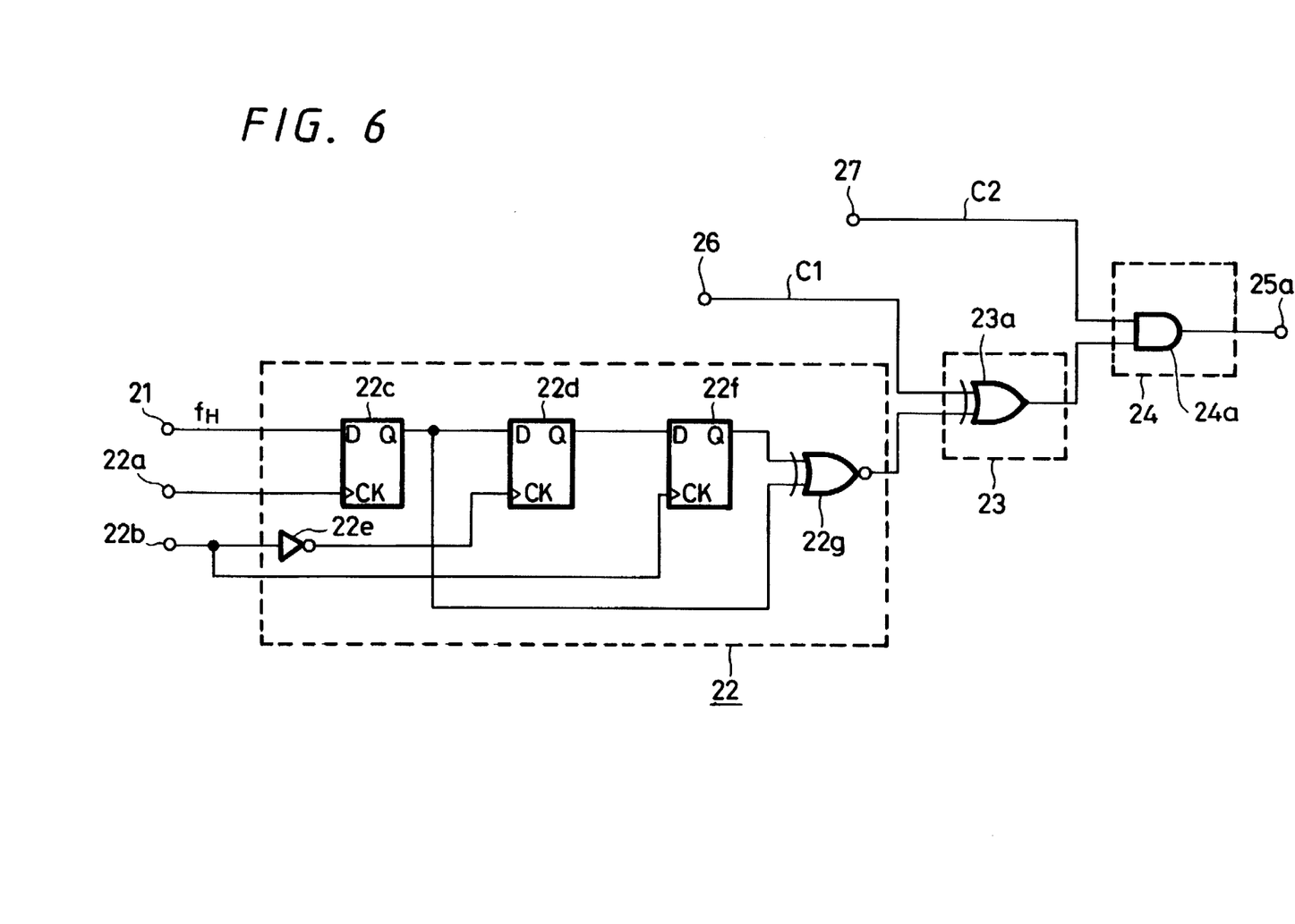
FIG. 6 is a block diagram showing the offset circuit in more detail.

FIG. 6 shows, in block diagram form, an arrangement of the offset circuit 20 more in detail.

In this example, the offset circuit 20 comprises D-type flip-flops and gate circuits which will be described below. The selector 25 is integrally formed with the polarity inverting circuit 23 and the offset-zero circuit 24. In the offset timing generator 22, the pulse with a frequency $f_H$ of the input video signal supplied to the terminal 21 is supplied to a D-input terminal of a D-type flip-flop 22c, and the V pulse supplied to a terminal 22a is supplied to a clock input terminal CK of the D-type flip-flop 22c. An output from a Q-output terminal of the D-type flip-flop 22c is supplied to a D-input terminal of a succeeding D-type flip-flop 22d.

The 2 V pulse supplied to a terminal 22b is inverted by an inverter-gate 22e, and supplied to a clock input terminal CK of the D-type flip-flop 22d. An output from the Q-output terminal of the D-type flip-flop 22d is supplied to a D-input terminal of a succeeding D-type flip-flop 22f. The 2 V pulse supplied to the terminal 22b is not inverted by the invert-ergate 22e, and supplied to the clock input terminal CK of the D-type flip-flop 22f. An output from the Q-output terminal of the D-type flip-flop 22f is supplied to one input terminal of an exclusive-NOR gate 22g. An output from the Q-output terminal of the D-type flip-flop 22c is supplied to another input terminal of the exclusive-NOR gate 22g.

A logical output from the exclusive-NOR gate 22g is supplied to the polarity inverting circuit 23 as the output of the offset timing generator 22. The polarity inverting circuit 23 comprises an exclusive-OR gate 23a, and the output of the offset timing generator 22 (i.e., logical output from the exclusive-NOR gate 22g) is supplied to one input terminal of the exclusive-OR gate 23a. The control signal C1 (inverting control signal) supplied to the terminal 26 is supplied to another input terminal of the exclusive-OR gate 23a. When the polarity inverting circuit 23 comprises the exclusive-OR gate 23a as described above, if the inverting control signal is a low-level "0" signal, then the output of the offset timing generator 22 is outputted from the exclusive-OR gate 23a as it is, and if the inverting control signal is a high-level "1" signal, then the output from the offset timing generator 22 is inverted and then output from the exclusive-OR gate 23a.

The output from the polarity inverting circuit 23 is supplied to one input terminal of a AND gate 24a comprising the offset-zero circuit 24. The control signal C2 (offset-zero control signal) supplied to the terminal 27 is supplied to another input terminal of the AND gate 24a. When the offset-zero circuit comprises the AND gate 24a as described above, if the offset-zero control signal is a high-level "1" signal, then the output from the polarity inverting circuit 23 is output from the AND gate 24a as it is, and if the offset-zero control signal is a low-level "0" signal, then the low-level "0" 1 signal is constantly output from the AND gate 24a regardless of the output state of the polarity inverting circuit 23.

An output from the AND gate 24a comprising the offset-zero circuit 24 is supplied through a terminal 25a to the adder 28 (FIG. 5). If the output from the offset-zero circuit 24 is the high-level "1" signal, then the adder 28 adds "1" to the value of count data supplied thereto from the count-down processor 18.

Operation of the above-mentioned circuits will be described below. Initially, operation of the count-down processor 18 shown in FIG. 5 will be described with reference to FIGS. 7A through 7D.

Figure 7A:
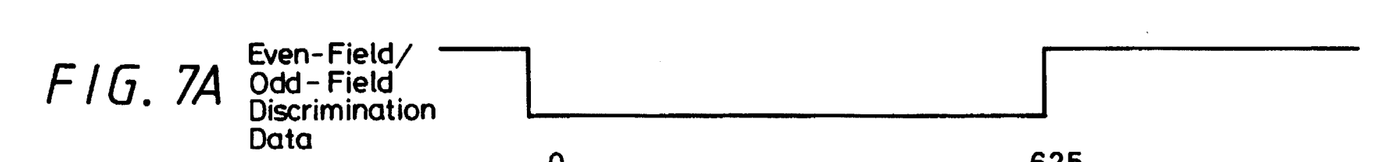
FIGS. 7A through 7D are timing charts used to explain an operation of the count-down processor.
Figure 7B:
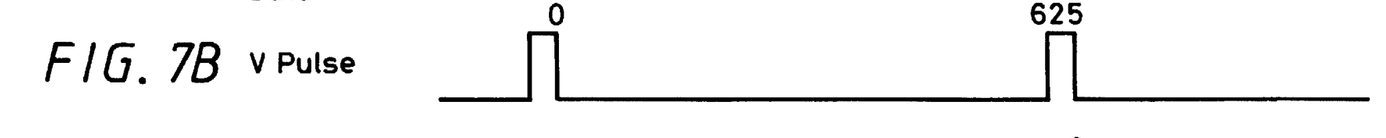
Figure 7C:
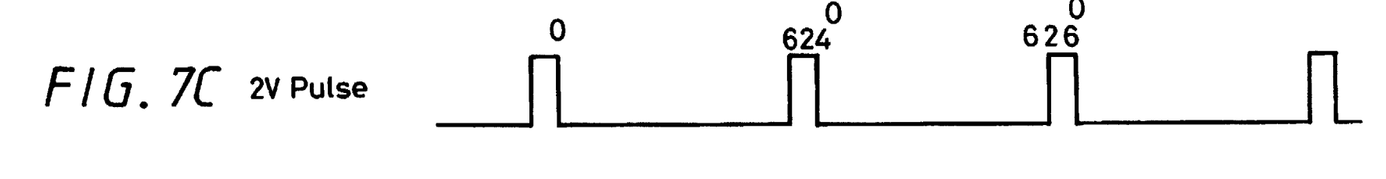
Figure 7D:
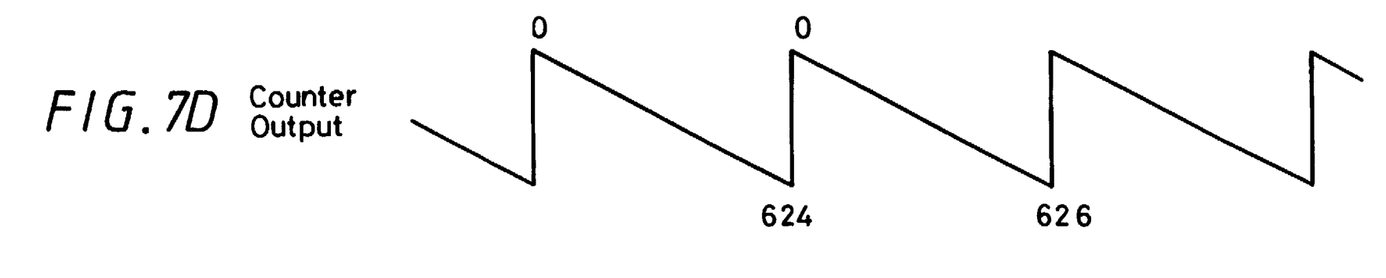

The even-field/odd-field discriminated data (see FIG. 7A) outputted from the count-down processor 18 becomes a signal which repeats high-level state and low-level state at every field period of the input video signal. The V pulse (see FIG. 7B) output from the count-down processor 18 is a pulse which rises in unison with the change of the even-field/odd-field discriminated data. The 2 V pulse (see FIG. 7C) output from the count-down processor 18 becomes a pulse with a period of about ½ of the period of the V pulse. The 2 V pulse is outputted from the count-down processor 18 when the count-down processor 18 counts the pulse with a frequency of $2f_H$. Hence, the count value obtained at the leading edge of the pulse is changed to "624" or "626" at every field. FIG. 7D shows the count value of the count-down processor 18 in the form of level. As shown in FIG. 7D, the maximum count value is changed to "624" or "626" at every field period.

An operation of the offset circuit 20 shown in FIG. 6 will be described below with reference to timing charts of FIGS. 8A through 8F.

Figure 8A:
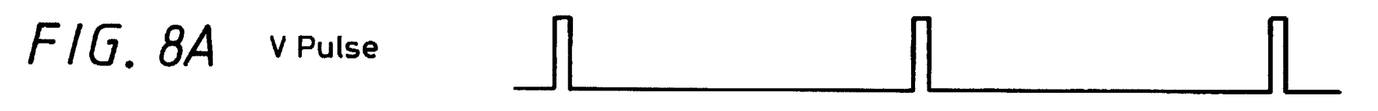
FIGS. 8A through 8F are timing charts used to explain an operation of the offset circuit.
Figure 8B:
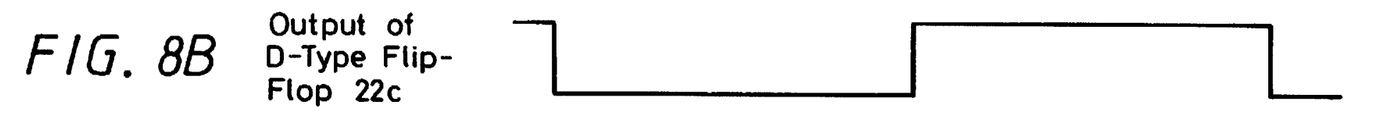
Figure 8C:
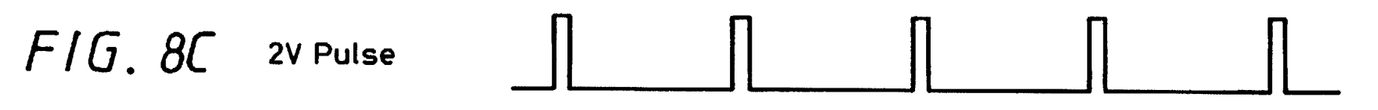
Figure 8D:
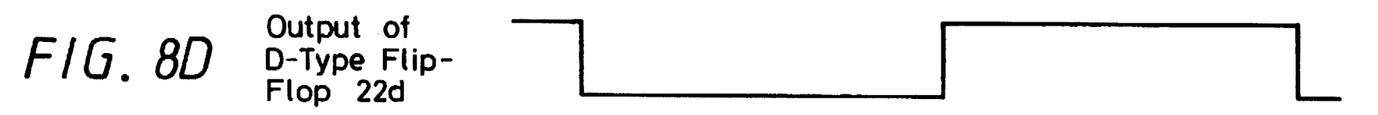
Figure 8E:
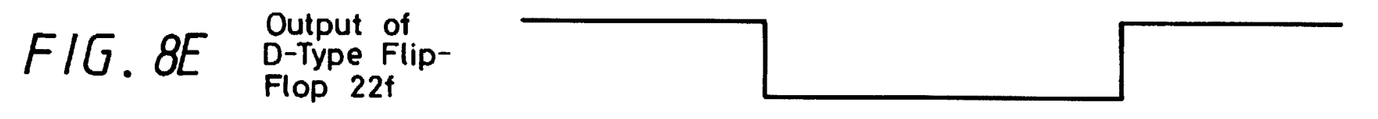
Figure 8F:
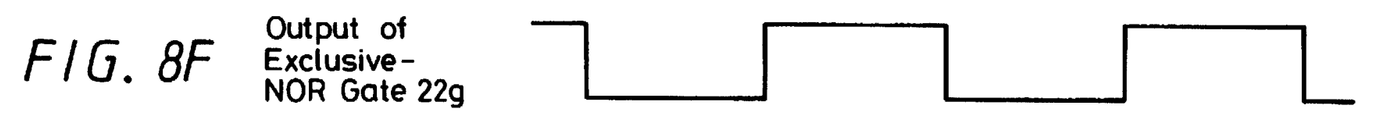

When a V pulse shown in FIG. 8A is supplied to the D-type flip-flop 22c, an output level (see FIG. 8B) of the D-type flip-flop 22c is changed in synchronism with the V pulse shown in FIG. 8A. When a 2 V pulse is in the state shown in FIG. 8C, an output (see FIG. 8D) of the D-type flip-flop 22d and an output (see FIG. 8E) of the D-type flip-flop 22f are shifted in phase by one period of the 2 V pulse from each other. Then, when the outputs of the two flip-flops 22c, 22f are supplied to the exclusive-NOR gate 22g, the exclusive-NOR gate 22g outputs a pulse which repeatedly goes to high-level "1" and low-level "0" at every field period of the double-scanning-converted video signal.

When the polarity of data is not inverted by the polarity inverting circuit 23 and the offset-zero processing is not effected in the offset-zero circuit 24, the output (see FIG. 8F) from the exclusive-NOR gate 22g is supplied to the adder 28 as it is, thereby setting a field in which only "1" is added to the count value and a field in which "1" is not added to the count value at every field of the double-scanning-converted video signal.

Figures 9A, 9B:
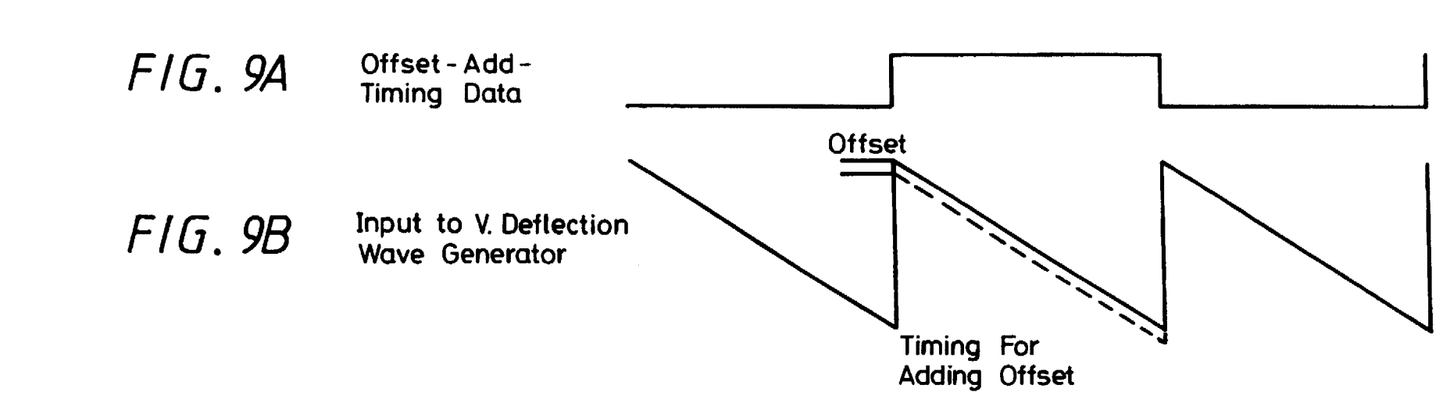
FIGS. 9A and 9B are diagrams showing a manner in which an offset value is added to an output of a counter.

FIGS. 9A and 9B show the manner in which "1" is added to a count value. Only when the pulse supplied to the adder 28 (shown in FIG. 9A: output from the exclusive-NOR gate 22g) rises, "1" is added to the count value of the data inputted to the vertical deflection wave generator 31 and thereby the position of the vertical deflection is shifted as shown in FIG. 9B.

Figure 10:
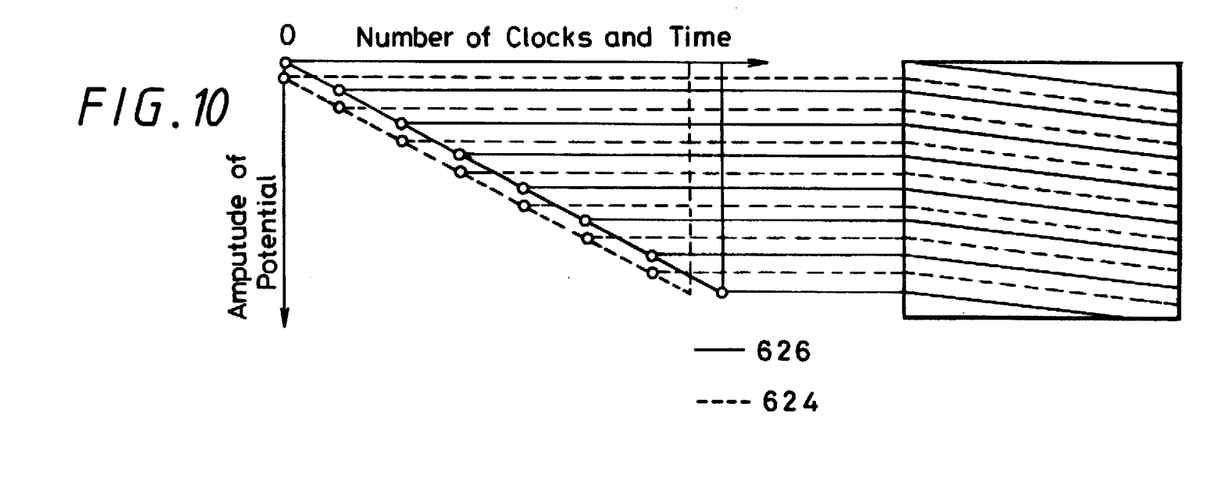
FIG. 10 is a schematic diagram showing a manner in which horizontal lines are scanned under the condition that the offset value is added to the output of the counter.

FIG. 10 is a schematic diagram used to explain a manner in which the position of the vertical deflection is being shifted. The left-hand side of FIG. 10 indicates the change of a vertical deflection control voltage at every field, and the right-hand side thereof indicates scanned states of horizontal lines (626 lines or 624 lines in actual practice). Solid lines show field periods of 626 horizontal lines, and broken lines show field period of 624 horizontal lines. Each horizontal line of the field period with 624 lines is interposed between the horizontal lines of the field period with the 626 lines because control data is offset by the adder 28. Accordingly, the scanning lines are accurately interlaced, and hence the television receiver according to the present invention receives and reproduces the double-scanning-converted video signal in the accurately-interlaced state. If the scanning lines are not in the accurate interlaced state shown in FIG. 10, then such an inaccurate interlaced state can be adjusted by varying an offset value.

When the output of the offset timing generator 22 is set to the offset-zero state based on the control signal C2 (offset-zero signal), the adding processing is not carried out by the adder 28 at all, and the non-interlaced state where a picture is displayed in the non-interlaced state can be presented.

As described above, according to the vertical deflection control circuit of the present invention, the double-scanning-converted video signal can be received and reproduced in the interlaced state only by adding the properly-selected offset value to the output of the counter. In this case, only the offset circuit 20 composed of one counter (count-down processor 18) and the offset circuit 20 composed of the flip-flops, the gate circuits and the adder are required, and the deflection control circuit according to the present invention can be simplified in arrangement unlike the prior art which required a plurality of counters.

The reverse interlaced state where the interlaced state is reversed and the non-interlaced state also can be easily realized by a processing in the offset circuit 20, and the vertical deflection control circuit according to the present invention can be applied to a variety of video signals by a simple arrangement when such video signals are double-scanning-converted. For example, since the reverse-interlaced state can be set, the present invention can be applied to a PAL-plus video signal. Further, since the non-interlaced state can be set, a teletext broadcast signal can be received and reproduced in the non-interlaced state in synchronism with the interlaced state of an input video signal when the teletext broadcast signal is double-scanning-converted. Specifically, since the teletext broadcast system transmits information by use of a vertical blanking interval, if the teletext broadcast signal is placed in the interlaced state based on a judged result of even-field/odd-field discrimination, then displayed information tends to become difficult to see. However, if such teletext broadcast signal is displayed in the non-interlaced state according to the vertical deflection control circuit according to the present invention, then such a defect can be avoided.

While the present invention is applied to the television receiver for receiving and reproducing the PAL video signal in a state that the PAL video signal is double-scanning-converted as described above, the principle of the present invention can be applied to other video signals and other receivers such as a monitor receiver.

In the above embodiment, the field in which the offset value is added to the output of the double-speed counter and the field in which the offset value is not added to the output of the double-speed counter are set in the double-scanning-converted video signal at every field period. However, the interlaced state may be realized by repeating the offset processing of the two-field period and the offset-zero processing of the two-field period. In this case, the output of the D-type flip-flop 22c or 22f disposed within the offset timing generator 22 may be used as the offset signal.

According to the vertical deflection control circuit of the present invention, the even-field/odd-field of the video signal is judged and the offset value is added to the output of the double-speed counter. Therefore, the vertical deflection control operation for receiving and reproducing the double-scanning-converted video signal in the interlaced state can be carried out easily.

In this case, the reverse-interlaced state can be easily realized by inverting the polarity of the timing signal by the polarity inverting means.

Further, the non-interlaced state can easily be realized by canceling the offset value in the offset-zero circuit.

Furthermore, according to the television receiver of the present invention, it is possible to easily arrange a television receiver of a simple arrangement capable of receiving and reproducing a double-scanning-converted video signal in the interlaced state and in which the video signal can be double-scanning-converted.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A vertical deflection control circuit comprising:
   a double-speed counter for counting a clock with a frequency $2f_H$ synchronized with a vertical sync signal, wherein $f_H$ represents a horizontal frequency of an input video signal;
   timing signal generating means for discriminating even-field/odd-field of said input video signal and generating a timing signal based on a discriminated result; and
   offset signal adding means for adding an offset value to an output of said double-speed counter synchronized with said timing signal.

2. The vertical deflection control circuit according to claim 1, further comprising polarity inverting means for inverting a polarity of said timing signal generated from said timing signal generating means.

3. The vertical deflection control circuit according to claim 1, further comprising an offset-zero circuit for canceling said offset value.

4. A television receiver comprising:

a double-speed counter for counting a clock with a frequency $2f_H$ synchronized with a vertical sync signal, wherein $f_H$ represents a horizontal frequency of an input video signal;

timing signal generating means for discriminating even-field/odd-field of said input video signal and generating a timing signal based on the discriminated result;

offset signal adding means for adding an offset value to an output of said double-speed counter synchronized with said timing signal; and a vertical deflection circuit for vertically deflecting electron beams on a screen of a cathode ray tube based on an output from said offset signal adding means.

5. A television receiver having a vertical deflection control circuit comprising:

counter means for counting a clock signal with a frequency of $2f_H$, said counter means being reset by one of a vertical sync signal or a pulse associated with said vertical sync signal, wherein $f_H$ represents a horizontal frequency of an input video signal;

vertical deflection wave generating means for generating a sawtooth wave with a frequency twice a frequency of said vertical sync signal from an output of said counter means;

offset signal generating means for generating an offset signal from a sync pulse of a frequency twice the frequency of said vertical sync signal obtained from said counter means, and said clock signal having a frequency of $2f_H$, wherein said offset signal is updated at a frequency twice the frequency of said vertical sync signal; and means for adding the output of said offset signal generating means with the output of said counter means.

* * * * *